(12) United States Patent
Rajasekaran et al.

(10) Patent No.: US 7,020,782 B2
(45) Date of Patent: Mar. 28, 2006

(54) SIZE-DEPENDENT HASHING FOR CREDIT CARD VERIFICATION AND OTHER APPLICATIONS

(75) Inventors: Sanguthevar Rajasekaran, Los Altos, CA (US); James Reno, Scotts Valley, CA (US)

(73) Assignee: Arcot Systems, Inc., Sunnyvale, CA (US)

( * ) Notice: Subject to any disclaimer, the term of this patent is extended or adjusted under 35 U.S.C. 154(b) by 848 days.

(21) Appl. No.: 10/094,036

(22) Filed: Mar. 8, 2002

(65) Prior Publication Data
US 2003/0172085 A1   Sep. 11, 2003

(51) Int. Cl.
*G06F 1/24* (2006.01)
(52) U.S. Cl. ...................... 713/200; 713/201
(58) Field of Classification Search ............... 713/200, 713/201
See application file for complete search history.

(56) References Cited

U.S. PATENT DOCUMENTS

| | | | |
|---|---|---|---|
| 5,511,190 A | | 4/1996 | Sharma et al. |
| 5,557,785 A | * | 9/1996 | Lacquit et al. ........... 707/104.1 |
| 5,673,252 A | * | 9/1997 | Johnson et al. ............. 370/449 |
| 5,802,521 A | | 9/1998 | Ziauddin et al. |
| 5,946,679 A | | 8/1999 | Ahuja et al. |
| 6,067,547 A | | 5/2000 | Douceur |

OTHER PUBLICATIONS

Maurer, W.D. et al.; "Hash Table Methods"; 1975, *Computing Surveys*, vol. 7, No. 1, pp. 5-19.
Sedgewick, Robert; "Algorithms"; 1988, *Addison-Wesley Publishing Company*, pp. 193 and 231.

* cited by examiner

*Primary Examiner*—Thomas R. Peeso
(74) *Attorney, Agent, or Firm*—Townsend and Townsend and Crew LLP

(57) ABSTRACT

Searching is an important problem that arises in a variety of applications, particularly for computerized databases. Further, many such applications involve searching set of (possible very large) integers (e.g., credit card numbers, employee identifiers, customer identifiers, dates, parts numbers, etc.). We present techniques for integer searching in a computer database based on a improved form of hashing which we shall refer to as "size-dependent hashing." This technique can be used to strike a balance between the available memory in the computer system and the required search time.

43 Claims, No Drawings

SIZE-DEPENDENT HASHING FOR CREDIT CARD VERIFICATION AND OTHER APPLICATIONS

FIELD

This application relates generally to techniques for computerized database searching and, more specifically, to searches of integer databases including, without limitation, databases of large integers such as those used in credit card verification processes during purchase transactions.

BACKGROUND

The problem of searching has been studied extensively and the available literature on searching is vast. There are many variations of the search problem dependent on the domain under concern, the type of queries, the application environment, etc. Even though a number of general techniques are available for searching, these may not yield optimal performance for specific applications. It is possible to develop application-specific techniques whose performance exceeds than those of the generic techniques. In this document we consider the problem of searching where the domain under concern is the set of (possibly very large) integers.[1] Integer searching is useful in a wide variety of environments including, without limitation, searches for credit card numbers (e.g., for validity checking during a purchase transaction), employee identifiers (e.g., for payroll or other corporate databases), customer identifiers, date searches (e.g., for calendars, computer file management systems), parts number searches (e.g., for inventory control), etc.

[1] As used throughout this patent, integer searching should be understood to include not only direct integer searching (i.e., where the data to be searched is originally represented in integer form) but also indirect integer searching (i.e., where the data to be searched can be converted into integer form, for example and without limitation, by assigning an integer equivalent to one or more alphabetical characters, etc.). It should also be understood that the term integer is not limited to base-10 systems, but is applicable to any other base. For example, a base-10 system would be described using the digits 0–9, while a base-16 system would be described using the digits 0–9 and A–F.

In general, let X represent the data set (or, equivalently, database) to be searched, and x the value to be searched for (e.g., a target value). The problem is to check if x is in X. One consideration of searching techniques is the amount of time required to complete the search.

If X is represented as an array a[1:n] (i.e., where n is the size of X), one known (simple) technique scans through every element of X to see if x can be matched with an element of X Such a technique takes linear time.

Alternatively, if the array is represented in sorted order, one could employ known binary search techniques (see, e.g., E. Horowitz, S. Sahni, and S. Rajasekaran, *Computer Algorithms*, W. H. Freeman Press, 1998) to perform the search in a manner requiring logarithmic time—an improvement over linear time.

Also consider a case where the elements of X can change dynamically (i.e., insertions and/or deletions can happen in X). In such a case, one must also consider the time required for the insert/delete operations. The insert/delete operations include both searching for a location at which the insert/delete is to be performed, as well as the actual insert/delete operation. As stated above, if X is represented as a sorted array, one can achieve logarithmic time performance for the search itself. What about the insert/delete operations? Assuming that the array representing X is of size n, each insert/delete operation will take linear time (i.e., O(n), where O represents an asymptotic upper bound)—worse than logarithmic time. This scheme will be satisfactory when the number of insert/delete operations performed is small, so that the linear time required therefor does not overwhelm the logarithmic time required for search. If this is not the case, one can employ balanced data structures such as a red-black tree, a 2-3 tree, etc. It is known that such data structures accommodate operations, including insert, delete, search, find-min, and find-max, such that each operation takes only O(log n) time to perform (see, e.g., Horowitz et al., supra, or T. H. Cormen, C. E. Leiserson, and R. L. Rivest, *Introduction to Algorithms*, MIT Press, 1991). Thus, the overall time requirement remains logarithmic.

If the domain under concern is the set of integers, it is also known that one can employ hashing techniques to solve the search problem. In particular, assume that the elements are integers in the range $[1,N]$.[2] A trivial form of hashing (in which the hashing function is simply the identity function) works as follows. One stores the elements of X as an array a[1:N] of lists (or, equivalently, lists). In the list a[1] one stores all the elements of X that have a value of 1, in a[2] one stores all the elements of X that have a value of 2, etc. If X has no repetition of elements, then each list of a will have either no elements or only one element. Thus, to check if x is in X, one simply has to search for x in the corresponding list a[x] and hence this will take only O(1) time. Insertions and/or deletions also takes O(1) time. Thus, both searching and insert/delete operation times here represent a significant improvement over both linear and logarithmic times.

[2] Or, equivalently, [0, N-1] if one begins counting from zero. The choice of whether to start counting from 0 or 1 is a matter of choice in an actual implementation.

Besides time requirements, computer implementations of searching techniques also face computer memory limitations. That is, the elements, lists and arrays must be accommodated within the available memory of the computer system. In the trivial hashing scheme mentioned above, the memory required is known to be no more than O(n+N). Where N (and thus n+N) is small, this scheme will work fine. But where N is large, there may not be enough memory in the computer. For example, if the elements of X are 16-digit base-10 numbers, then $N=10^{16}$, and one will need space for $10^{16}$ pointers (among other things). This implies (assuming that each pointer is 4 bytes) a memory requirement of at least $4 \times 10^{16}$ bytes, i.e., $4 \times 10^7$ GB—which exceeds the available memory on many currently available computer systems.

In cases where N (and thus n+N) is prohibitively large, one can use the following, more common, form of hashing. Assume that there is space for an array of L lists, i.e., the memory available is at least $\Omega(L+n)$ (where $\Omega$ represents an asymptotic lower bound). Then we choose a function (called the "hash function") h: $\Sigma \rightarrow [1:L]$, where $\Sigma$ represents the domain, and [1:L] represents the range, of the function h. If y is an element of X, it will be stored in the list a[h(y)]. The lists now can have any number of elements from zero to n (n would represent the extreme case where one list contains all the elements, and all other lists are empty), where n is the size of X. To search for a given value x, one scans (perhaps sequentially) through the list a[h(x)] of all elements of X that hash to the same value, h(x), as x. Assuming one has used sequential searching, the search time will be proportional to the number of elements in this list, and the search time in the worst case can be $\Omega(n)$.[3] The same is true for insert/delete operations. If there are two elements in the same list of a, these two elements are said to collide. In general there could be any number of collisions. On the other hand, the expected number of elements in any list can be seen to be n/L (under uniformity assumptions in the input space). Thus the expected time needed to perform any of the operations under concern is only O(1) assuming that L≧n.[3]

[3] Other search techniques (e.g., 2-3 trees, etc.) could yield better (e.g., logarithmic) search times.

The performance of the hashing method described above very much depends on the characteristics of the chosen hash function h. For example, if the hash function is overly complex, the computer system might take a very long time to compute h(x). If the hash function spreads the elements of X across the lists of a relatively evenly, this will have the effect of reducing the searching time.

We disclose herein various embodiments and aspects of an improved search scheme, based on a new hashing technique, that can be tailored to strike a desired balance between the computer memory available and the search time required.

SUMMARY

We disclose various embodiments and aspects of an improved hashing-based methodology suitable for integer searching[1] applications. The problem is to search a data set (or, equivalently, a database) X for a particular value x.

[1] As used throughout this patent, integar searching should be understood to include not only direct integer searching (i.e., where the data to be searched is originally represented in integer form) but also indirect integer searching (i.e., where the data to be searched cna be converted into integer form, for example and without limitation, by assigning an integer equivalent to one or more alphabetical characters, etc.). It should also be understood that the term integer is not limited to base-10 systems, but is applicable to any other base. For example, a base-10 system would be described using the digits 0–9, while a base-16 system would be described using the digits 0–9 and A–F.

In our methodology, we construct a hash function that receives an input of l digits, and constructs a hash of the value as the first q digits of the input. Both the value to be searched for (e.g., a target value), and the data set to be searched, are hashed in this manner, and the first q digits of the value to be searched for are therefore used as an index to the hash table.

Application of this hash function to the set of values to be searched, say X, will partition X into an array of L lists, where the value of L is $10^q$ (in the exemplary case of a base-10 number system). The lists can be represented using linked lists, 2-3 trees, red-black trees, and many other structures known to those skilled in the art. Typically, the greater the value of q, the less the time required to conduct a search.

To process a search operation (for x), we take the first q digits of x as the index to the hash table and reach the corresponding element of the hash table array a. Each list will contain those elements (or value) of X which hash to the same value represented by the first q digits. We search the structure at this element of a for x.

The choice of q can be predetermined (whether fixed or variable) or computed dynamically, as long as the resulting array of L lists can be accommodated by the memory of the computer system in question. In one exemplary aspect of this embodiment, we determine the required memory to store the lists for each of a plurality of potential values for q, and select a value of q representing a desired time-memory balance. We also illustrate how to compute the maximum possible value of q in accordance with the specific memory requirements of a particular environment.

Some data sets to be searched require updating in the form of inserting some new data and/or deleting some existing data. We can facilitate such insert/delete operations by using our search methodology to search for insertion points and/or data to be deleted. In cases where the time for insert/delete processing is significant compared to the search time, we can reduce the effect of the former by choosing a value of q for which the array size is a relatively small multiple of the number of elements in the data set to be searched.

Occasionally, as a result of material additions or deletions, one or more lists may become too large, leading to increased memory and/or search time requirements. One way to ameliorate this concern is to update the value of q, create a new array of lists, and rehash the data set to be searched.

We could also temporarily postpone insert/delete operations by use of an auxiliary data structure to contain information on insertions/deletions which are not reflected in the hash table. In processing a search query, we search both the hash table, and also the auxiliary data structure. If the size of the auxiliary data structure is not large, the time required for the additional search will be relatively small. When this is no longer true, we can update the hash table to include the insertions/deletions. By postponing insert/delete operations, many updates can be done to the hash table collectively, thereby amortizing and reducing the cost for processing each insert or delete operation.

Another way to deal with large lists (whether caused by insert/delete operations or otherwise) is to partition such lists into sublists. The partitioning can be done in exactly the same manner as described above. That is, for each list to be partitioned, determine the number of digits to be used for partitioning, and construct a hash table. The digits to be used for indexing the hash table can be the next most significant digits other than the q digits originally used in the first level of partitioning. Indeed, we can continue this process of refining the list sizes to any number of levels, depending on the needs of any particular implementation and data set. We thus implement a multi-level hashing and searching scheme, in which each level can be searched in the manner set forth above with respect to a single level of hashing and searching.

One common environment for integer searching involves credit card checking, in which the data set to be searched includes intervals denoting ranges of valid credit card numbers. The goal is to determine whether any of the intervals includes the number of the credit card being checked. Of course, interval searching is also applicable to a wide variety of other environments. In general, interval searching involves checking the card to be searched for against the starting range of the intervals in the data set to be searched. In some cases, a card might be outside of (e.g., smaller than) an interval yet hash to the same value as the beginning of that interval. For example, consider a card 1234 and two intervals, [0999, 1240] and [1290, 2010], and further suppose q=2. Then, a hash table search on beginning interval data will identify the interval [1290, 2010] because both 1234 and 1290 hash to the same value (namely, 12). However, the proper interval is really [0999, 1240]. Thus, we also have to check the next-nearest interval on the left. The very same issue arises when the list at the searched hash table index is empty. Both kinds of (problematic) intervals may be regarded as "out-of-range" for the card to be searched.

One possible way of identifying such a next-nearest interval involves the following modification to the hash table data structure. For every entry of the hash table that is empty, we store in it the index of the first nonempty list to its left. This also helps with those entries of the hash table that are non-empty because, for any non-empty entry, we still need to check its nearest neighbor to the left. If the neighbor is non-empty, we have identified the next-nearest interval. If the neighbor is empty, we follow the empty neighbor's pointer to its nearest non-empty neighbor to the left, continuing as necessary until we locate the first non-empty neighbor. Those skilled in the art will readily appreciate that the searching techniques set forth above are usable in any other context requiring interval searching, and not just limited to the exemplary context of credit cards.

DETAILED DESCRIPTION

We shall use the terms "size-dependent hashing" or "SDH" to refer to various exemplary embodiments, and associated aspects, of an improved hashing-based methodology for searching in an integer domain. More specifically, we shall first describe an embodiment of size-dependent hashing in which the hashing and searching occur at a single level. We shall then describe another embodiment in which the hashing and searching occur at multiple levels. We shall then describe another embodiment of size-dependent hashing applied specifically in the environment of credit card verification. The size-dependent hashing techniques disclosed herein can be used with integers that are very large. For example, in credit card environments (described in Section C below), the card numbers are often as many as 19 digits long.

A. Single-Level Size-Dependent Hashing

1. Hash Table Construction

We begin with a basic version of SDH. In Section B below, we shall describe modifications to this basic version. In the basic version, we use a certain number of leading digits of x as a hashing index. In particular, if x is a l-digit number, and the value to search for is $x=d_1 d_2 \ldots d_q \ldots d_l$ (where the $d_i$'s are the digits), then we employ the first q digits as an index to a hash table used for searching. In other words, we construct a hash function $h(x)=d_1 d_2 \ldots d_q$, for some appropriate value of q.

Application of this hash function to the set of values to be searched, X, will partition X into an array of L lists, where the value of L is $10^q$. The foregoing assumes we are using a base-10 number system, which is typical for human-readable data. Thus, as a matter of convenience, we shall describe our exemplary embodiments in the context of base-10. Those skilled in the art will readily understand the corresponding constructions for values in other base systems. For example, in base-b, we would have $L=b^q$.

We construct a hash table as an array of the L lists, say a[1:L], where each array element points or otherwise provides access to its respective list, where each list represents one of the possible values of a q-digit integer string. For example, if q=2, then $L=10^2=100$ and there will be 100 lists. The first array element points to the first list, which could contain those elements of X that begin with the digits "00"[4]. The second array element points to the second list, which could contain those elements of X that begin with "01." In a similar manner, the hundredth array element points to the hundredth list, which could contain those elements of X that begin with "99."

[4] Assuming that integers are left-padded to make the members data set to be searched all have the same length. Of course, we could also use right-padding, or no padding at all, depending on the needs of the actual implementation and the data set. If no padding is done, we suggest that a separate hash table be built for each distinct length.

There are many ways in which the lists themselves can be implemented, using techniques known to those skilled in the art. For example, they can be stored as sorted arrays, linked lists, 2-3 trees, red-black trees, etc.

2. Hash Table Searching

To process a search operation (for x), we take the first q digits of x as the index to the hash table and reach the corresponding element of the array a. We search the structure at this element of a for x. We also process insert and delete operations in a similar fashion, by using SDH to search for insertion points and/or data to be deleted.

3. Memory Considerations

The choice of q can be predetermined (whether fixed or variable) or computed dynamically, as long as the resulting array of L lists can be accommodated by the memory of the computer system in question. In one exemplary aspect of this embodiment, we dynamically determine a value for q as follows:

for j:=1 to l do (j is a potential value of q)
{
1. Use the first j digits to partition X into $10^j$ lists; and
2. Determine the maximum size of any of the lists, $M_j$ by an actual count[5] of the membership of each list after partitioning X.

[5] See also the example in Section C.2 for an alternative to actual counting.

}

Plausible values for q include those values of j for which there is enough memory. Additional memory allocation considerations may be used to further select one of the plausible values. For example, q could be selected based on a determination that $M_j$ is acceptably small (a matter of implementation choice). Suppose that $q_1$ and $q_2$ are candidate values under consideration (for each of which there is enough memory). Also, assume that $q_1 < q_2$. If $M_{q2}$ is significantly smaller than $M_{q1}$ then perhaps it is worth picking $q_2$ as the value for q. On the other hand, if $M_{q2}$ is only marginally smaller than $M_{q1}$, then we have reached a point of diminishing return, and we can save memory by picking $q_1$ as the value of q. These and other memory allocation guidelines are well known to those skilled in the art, and need not be described in greater detail herein. In any particular implementation, the memory allocation constraints will be a matter of choice of the system designer or operator.

4. Time Considerations

The size of X is n, and we are partitioning X into L lists. Thus, expected size (in a statistical sense, but not necessarily the actual size) of any list is n/L, and the expected time needed to process any of the operations under concern is $O(\log_2(n/L))$, assuming that each list is kept as a balanced tree (2-3 tree for example). Since $L=10^q$, this time is approximately equal to $\log_2 n - 3.3q$. Hence, the greater the value of q, the less the search time required.

a. Example

Consider a case where $n=10^6$, $N=10^{25}$, q=5, and $L=10^5$. Here, $n=10^6$ is the size of X, which can therefore contain 1 million integers. Similarly, $N=10^{25}$ (actually, $10^{25}-1$ if we start counting from 0) is the largest possible integer, so that each integer can have 25 digits (0 through $10^{25}-1$). Finally, $L=10^5$ is the maximum number of lists (according to memory constraints), each list having up to n elements).

As stated in the Background Section, a (prior art) pure red-black tree storage for all the n elements would require an average and worst case search time (per the third paragraph of the introduction) of $O(\log_2 n) \approx \log_2(10^6)=20$. If we employ the basic version of SDH, the above formula shows that the expected time for the operations is significantly improved to $O(\log_2(n/L)) \approx \log_2(10)=3.3$.

5. Balancing Memory and Time Considerations

Clearly, it is better to increase q (and hence L, since $L=10^q$) since this will reduce the expected time needed to process our operations. On the other hand, an increase in q will imply an increase in the memory requirement. Judicious selection of q can be used to strike a balance between these two competing constraints.

Occasionally, as a result of material additions or deletions, the distribution of the data to be searched among the various lists might become skewed or asymmetric. A large list (at least compared to the statistical average) could, in turn, lead to increased memory and/or time requirements for searching that list. One way to ameliorate this concern is to update the value of q (e.g., using the techniques described herein or otherwise), create a new array of lists, and rehash the data, as the data set to be searched changes. This may be particularly beneficial, for example, in applications where search operations are more frequent than insert and delete operations, so that the additional cost due to updating-recreating-rehashing can be neglected. This process can be implemented to occur (a) upon operator command (e.g., in response to observed changes in memory requirements and/or processing time), (b) periodically (e.g., on a fixed schedule), or (c) automatically (e.g., in response to changes in memory requirements and/or processing time in excess of a specified threshold).

a. Insert/Delete Considerations

It is often necessary to perform insertions or deletions on a data set to be searched. Thus, in addition to the search time and memory considerations discussed previously, a related consideration affecting selection of q takes into account insert/delete processing. One rule of thumb for taking into account insert/delete processing is to choose a value of q for which the array size is a small (e.g., $O(1)$) multiple of n.

In fact one simple exemplary implementation could work as follows. Choose q to be $\lfloor \log_{10} n \rfloor$ (representing a floor), or even $\lceil \log_{10} n \rceil$ (a ceiling) if there is space. Then $L=10^q$ will be bounded in some fashion by n and, in practice, probably relatively close to n. Since n is the size of the search data X, the expected size of each lists is $O(1)$, and there will not be too many gaps in this array. This will facilitate efficient insert/delete operations. In addition, if we maintain the lists in sorted form, insert/delete operations will be further facilitated.

We could also employ the following strategy to temporarily postpone insert/delete operations. Keep an auxiliary data structure (such as a 2-3 tree, etc.) to contain information on new insertions and deletions (which are not reflected in the hash table). When processing any search query, search both the hash table (using SDH), and also the auxiliary data structure. If the size of the auxiliary data structure is not large, the time required for the additional search will be relatively small. When the size of auxiliary data structure exceeds a threshold value, or the time required for searching it becomes comparable to the time for searching the hash table, we can update the hash table. By postponing insert/delete operations, many updates can be done to the hash table collectively (in $O(A)$ time, A being the size of the array), thereby amortizing and reducing the cost for processing each insert or delete operation.

B. Multi-Level Size-Dependent Hashing

In this section we show how to further improve the performance of the basic version of SDH. In the basic version of SDH, even after picking a value of q that addresses memory considerations, some of the lists can be fairly large. When the element x searched for falls in any such list, the processing time may be high. In the immediately preceding section, we described rehashing the entire array of lists to address this concern. In this section, we propose another technique that can be used to ameliorate this problem.

In particular, we identify those lists that are unacceptably large[6] (depending on the constraints in any particular implementation and data set), and partition each of such lists into sublists. The partitioning can be done in exactly the same manner as in the basic (single-level) version of SDH. That is, for each list to be partitioned, determine the number of digits to be used for partitioning, and construct a hash table. The digits to be used for indexing the hash table will be the next most significant digits other than the q digits originally used in the first level of partitioning.

[6]The identification can occur: (a) in response to an operator command (e.g., in response to observed changes in memory requirements and/or processing time); or (b) automatically (e.g., in response to changes in memory requirements and/or processing time in excess of a specified threshold).

Indeed, we can continue this process of refining the list sizes to any number of levels, depending on the needs of any particular implementation and data set. Each level of partitioned lists is then searched in the manner as set forth above with respect to the basic (single-level) SDH technique.

C. An Exemplary Credit Card Verification Environment

1. Introduction

In credit card purchase transactions, it is customary to verify that a credit card number is valid prior to authorizing the transaction. For example, in a computerized network (e.g., the web), credit card checking is often implemented at a directory server associated with a payer authentication service. A merchant or other party checking the credit card's validity sends a request to the directory server to verify if a given card is valid. If the card is valid, the merchant may also (optionally) desire to receive additional information about the credit card. For example, the merchant might wish to know whether the credit card/credit card holder participates in VISA's "3-D Secure"/"Verified by VISA" program, Mastercard's SPA program, or some other secure payment scheme. The additional information is often contained in an access control server (or other computer accessible to the directory server). Thus, if the directory server determined that a card is valid, the directory server may further communicate with the access control server to obtain this additional information. Often, the communication with the access control server entails accessing its URL (or other network identifier) from a field associated with the credit card validity checking data.

Using the nomenclature described above, the goal is to check whether a given credit card, $x=C$, is contained in a set of validity data, X. Typically, the credit card number C is quite large. For example, American Express cards have 15 digits, VISA cards have 13 or 16 digits, and MasterCard or Discover cards have 16 digits. In addition, to ensure that the card presenter has physical possession of the card, some VISA and MasterCard implementations also require use of a 3-digit cardholder verification value that is printed on the back of the card . . . effectively bringing the card length up to 19 digits. Thus, in an exemplary embodiment, the size of the domain to be searched might be $N=10^{19}$.

In typical credit card checking implementations, the set X includes n intervals as its elements. An interval might be a pair such as <BeginIndex, EndIndex> denoting a range of valid credit card numbers. For example, one or more intervals might represent valid credit cards issued by different banks. Conventionally, the intervals in X are distinct, so that no two intervals are overlapping.

The intervals of X could (optionally) also be associated with additional information related to the credit card. For example, this information could be a URL of an access control server which supports all the credits cards in the associated interval. It is required to check if C falls in any of the intervals in X and if so return the corresponding URL.

One exemplary way of organizing X is as follows. We use three arrays of size a[1:n],b[1:n], and c[1:n]. Here n is the number of intervals. The array a stores the BeginIndexes of the intervals in sorted order. The arrays b and c store the corresponding EndIndexes and URLs, respectively.[7] In general, given any credit card C, we perform a binary search in a (i.e., we search the BeginIndex array) and find an index i such that $a[i] \leq C < a[i+1]$. That is, we determine the interval in which C must occur, if C occurs at all in any interval. We then test the EndIndex array to determine whether C actually occurs in that interval, as determined by $a[i] \leq C \leq b[i]$. If so, we (optionally) return the corresponding element of the URL array, c[i]. If not, we return "invalid card number".

[7] The foregoing exemplary discussion is presented in the context of credit card authentication, where searching involves two arrays (and, optionally, a third array) of data. The reader will readily appreciate that, in general, an arbitrary number of arrays can be accommodated depending on the characteristics of the particular application.

2. Size-Dependent Hashing for Credit Card Searching

In the previous section, we discussed the exemplary environment of credit card verification in general terms. We now show specifically how to employ single-level SDH to search BeginIndex. Those skilled in the art will readily appreciate how to implement the corresponding multi-level version.

a. Memory and Time Considerations

We first identify an appropriate value for q as discussed in Section A.3. More specifically, in one exemplary embodiment, we do the following. Here l is the number of digits in the credit cards.[8] Let $a_1, a_2, \ldots a_n$ be the BeginIndexes in X

[8] For example, 11, 13, 15 or 16 for commonly available cards.

for j:=1 to l do (j is a potential value of q)
{
1. Create a working array of integers Q[1: n] and initialize it to zeros. Each element of this array Q[] will store j-digit integers.
2. for k:=1 to n do
   {
   For $a_k = d_1 d_2 \ldots d_l$, store $d_1 d_2 \ldots d_j$ in Q[k]. That is, store the first j digits of each BeginIndex in a corresponding slot of Q. (Note that we are not creating lists here, just picking out the j most significant digits of the begin indexes).
   }
3. Sort the array Q. This can be done using quicksort, radix-sort or other well-known sorting techniques. For example, see Horowitz et al., supra. We note that sorting Q is equivalent to sorting by the $1^{st}$ j digits of a.
4. Scan through Q and identify the maximum size of any list, $M_j$. Note that sorting+scanning of array Q is an alternative to the manual counting of maximum list size in the corresponding example disclosed in Section A.3 because after sorting, it is easy to identify the maximum size of any list by inspection.)
5. Store $(j, M_j)$ in a list R.
}

Then, review the list R and pick an appropriate value for q (higher values reduce search time), such that there is enough memory (i.e., $M_q$ is sufficiently small).

i. Example—Balancing q vs. M

Suppose n=4,l=4, and the BeginIndex data are $a_1$=4533, $a_2$=1112, $a_3$=3129 and $a_4$=1123.

In the first pass of the outer do loop (j=1), we have Q[1]=4, Q[2]=1, Q[3]=3 and Q[4]=1, which sorts to Q[2]=1, Q[4]=1, Q[3]=3 and Q[1]=4. By inspection, the maximum size of any list is $M_1$=2, since 2 BeginIndexes hash to 1.

In the second pass of the outer do loop (j=2), we have Q[1]=45, Q[2]=11, Q[3]=31 and Q[4]=11, which sorts to Q[2]=11, Q[4]=11, Q[3]=31 and Q[1]=45. By inspection, the maximum size of any list is $M_2$=2, since 2 BeginIndexes hash to 11.

In the third pass of the outer do loop (j=3), we have Q[1]=4533, Q[2]=1112, Q[3]=3129 and Q[4]=1123, which sorts to Q[2]=1112, Q[4]=1123, Q[3]=3129 and Q[1]=4533. By inspection, the maximum size of any list is $M_3$=1, since no 2 BeginIndexes hash to the same value.

In the fourth pass of the outer do loop (j=4), we have Q[1]=4533, Q[2]=1112, Q[3]=3129 and Q[4]=1123, which sorts to Q[2]=1112, Q[4]=1123, Q[3]=3129 and Q[1]=4533. By inspection, the maximum size of any list is $M_4$=1, since no 2 BeginIndexes hash to the same value.

Therefore, $R=[j,M_j]=(1,2),(2,2),(3,1),(4,1)$. Since $M_3$ and $M_4$ are of the same value, a choice of q=4 can be ruled out (since the corresponding array L takes up more space). If there is enough memory to support q=3, then that will be preferable. If not, we will be left with a choice of q=1 or q=2. Both $M_1$ and $M_2$ have the same value. Thus in this case a choice of q=1 will reduce computation time with no additional memory requirement ii. Example—Computing the Maximum Value of q The discussion in Sections A.3 and C.2.a involved scanning through all possible values of q to determine the memory usage. Often (although not necessarily), certain values of q will require more memory than is available. In such cases, for efficiency purposes, it may be desired to limit the memory calculation to potential values of q that fit within the available memory (i.e., to set an upper bound on the do loop index j rather than searching all values up to and including l, the length of the members of the data set to be searched). Or, it may be desired to set up a hash table that uses all available memory. In either case, it would be useful to know in advance the maximum possible value of q in accordance with memory constraints. The memory constraints will, of course, depend on the list structures used and the characteristics of the data set to be searched.

We shall illustrate how to compute the maximum value of q using examples involving particular types of list structures in a credit card checking environment. Those skilled in the art will readily appreciate how to perform similar computations for other types of list structures and/or in other environments.

EXAMPLE 1

SDH Using Linked Lists

Let M be the amount of memory (in bytes) available in the computer. Consider an example where M is 100 MB. Suppose we are searching a credit card database containing 10,000 entries, so there are n=10,000 ranges in the database.

The hash table will include an array of L lists, where $L=10^q$. What is the largest allowable value of q?

First, we need to determine the memory consumed by each of the L lists within the array. In the operating environment of this example, each list includes credit card, URL and pointer references. If a credit card has 19 digits, each credit card number can be represented with 64 bits (since $10^{19}=2^{63.11}$, we round up to 64) and hence takes 8 bytes. Also assume that each URL has at most 255 characters (and hence takes up at most 255 bytes), and that each pointer is of length 4 bytes.

If the lists are realized as linked lists, the array a[] will be an array of linked lists. Each node (element) in any linked list will have two credit card numbers (defining the interval), a URL (for the cards in the interval), and a (linked list) pointer. In a linked list, this pointer simply points to the next element (node) in the linked list (if any). Thus each such node occupies a space of at most 2(8)+255+4=275 bytes. There are n such nodes in all, so that up to 275n bytes are required for storing the content of all nodes (elements) of the L lists in the array.

The array provides access (via a series of pointers or otherwise) to these stored lists, so the array a can afford to use a space of M−275n to store its (list) pointers. Each element of the array is a pointer pointing either to the head of a list (if the list is non-empty), or a null pointer (if the list is empty), with either kind of pointer requiring 4 bytes. Thus, the array a can be of maximum size (M−275n)/4. Stated another way, according to the available memory, the maximum number of lists in the array is L=(M−275n)/4.

Since $L=10^q$, we conclude that the value of q can be as large as $\log_{10}((M-275n)/4)$. For our example, this evaluates to $q_{max}=7.41$, which we round down to an integer value of 7. So, our hash table can have a maximum of $L=10^7$ lists when using a linked list implementation.

In this example, we have used up all the memory, which should minimize the necessary search time. Indeed, we can estimate a search time as $O(\log_2(n/L)) \approx \log_{10}(n/L)/\log_{10}(2) = 3.32 \log_{10}(n/L) = 3.32 \log_{10}(10^4/10^7) = -9.96$ or, effectively, zero.[9] By comparison, the (prior art) red-black search time is $\log_2(n)=3.32 \log_{10}(n)=3.32 \log_{10}(10^4)=13.3$.

[9] This is a mathematical estimate. Of course, in reality, a search time cannot be negative or even zero. In fact, actual search time reflects both a "variable cost" (which we have been discussing) and a "fixed cost" (which we have not discussed, but which sets a floor on the search time in all cases). We have not described the fixed cost because: 1) in most cases (although not here) it is negligible compared to the variable cost; and 2) it applies equally to all the searching techniques disclosed herein, whether prior art or SDH. The "fixed cost" reflects the fact that any searching algorithm has to take at least two units of time. One unit is needed to compute the hash function. The list hashed to by the function will then have to be searched. Whether this list is empty or not, at least one more unit of time is needed to search through this list. Hence, the fixed cost is typically 2.

EXAMPLE 2

SDH Using 2-3 Trees

Here we consider the case where we use 2-3 trees to organize the lists. The 2-3 trees contain n leaf nodes and, at most, an additional n internal nodes.

Each internal node has three pointers (because it has either 2 or 3 children) and two credit card numbers. A pointer takes 4 bytes to store, and a credit card number takes 8 bytes. Thus each internal node takes up a space of 3(4)+2(8)=28 bytes. Thus, the n internal nodes in a 2-3 tree will consume (in this example) at cost 28n bytes.

Each leaf node has two credit card numbers and a URL. Assuming that a URL has at most 255 characters (bytes), each leaf node can take up a space of 255+2(8)=271 bytes. Thus, the n leaf nodes in a 2-3 tree will consume (in this example) 271n bytes.

Thus, the 2-3 tree needs a space (in the worst case) of 28n+271n=299n bytes. Subtracting this from the available memory, M, leaves a space of M−299n to store the pointers of the array a. Since each pointer takes 4 bytes, a can be of size (M−299n)/4. Since $L=10^q$, we conclude that the value of q can be as large as $\log_{10}((M-299n)/4)$. Assuming (as in the previous example) that M is 100MB and n=10,000, this evaluates to $q_{max}=7.38$, which we round down to an integer value of 7. So, our hash table can have a maximum of $L=10^7$ lists when using a 2-3 tree implementation.

b. Hash Table Construction

Once we identify the appropriate value for q, we construct the hash table as an array a of lists. As those skilled in the art will appreciate, a list could itself either be a sorted array (for example and without limitation, a linked list, etc.) or a balanced tree (for example and without limitation, a 2-3 tree, a binary tree, etc.).

We now scan through the BeginIndex elements $a_1, a_2, \ldots, a_n$ and store them in the appropriate places. For instance let y be one of the elements in this sequence. If $y=d_1 d_2 \ldots d_l$, we know that y belongs to the list $a[d_1 d_2 \ldots d_q]$ (since $q \leq l$). We insert y in the corresponding list structure (e.g., 2-3 tree, etc.). We can also process search and delete operations in a similar fashion.

C. Hash Table Searching

Given a credit card C, we proceed to search X (as represented by the hash table a) for x=C as follows. We use the first q digits of C as a search index in hash table a. For convenience, let C' denote the integer corresponding to the first q digits of C. There are two cases to consider. The first case is when a[C'] is nonempty. In this case, we search a[C'] to check if there is an interval matching C' (by checking the corresponding EndIndexes). If a matching interval is found, the card is determined to be valid (and we can take any other optional steps such as accessing a URL or other additional information linked to or associated with the BeginIndex).

We note that, if a matching interval is not found in the course of searching a[C'], this does not necessarily mean that that there is no matching interval. This can occur because a particular element (or elements) of X, corresponding to the nonempty hash table element a[C'], can exceed the value of C—even though they hash to the same value by virtue of sharing the same first q digits. For example, consider for example the case of 6-digit credit cards. Let the intervals under concern be [149376, 151008], [151256, 1531560], [154172, 154270], [154280, 154390], and [157151, 158211], and let q be 3. If C is 151334, then a[151] will be searched and a match will be found. If C is 151005, a[151] is not empty but will not have a matching interval. However, a[149] will. Thus, we have to check not only a[C'] but also the nearest nonempty list of a[] that is to the left of (i.e., less than) C'. In other words, we also have to check a[C''] where C'' is the largest integer such that C''<C' and a[C''] is nonempty.

The second case is when a[C'] is empty. This could (but does not necessarily) mean that there is no matching interval for C. For example, consider the case when C is 155372, and the intervals are those set forth in the preceding example. In this case a[155] is empty and also there is no matching interval for C. On the other hand if C is 152764, a[152] will be empty but there is still a matching interval for C. One way of handling this case is as follows. We identify the largest C" such that a[C"] is nonempty and C"<C'. We then search for C in a[C"].

Thus we conclude that, in either case, it suffices to search through the lists a[C'] and a[C"] where C" is the nearest value less than C' such that a[C"] is nonempty. How do we identify such a C"? A linear search will work, but may be very slow. One possible improvement involves the following modification to the above data structure. For every entry of a[] that is empty we store in it the index of the first nonempty list to its left. This can be done in just one scan through a after its construction. Note, this also helps with those entries of a[] that are non-empty because, for any non-empty entry, we still need only check its neighbor immediately to the left. If the neighbor is non-empty, it constitutes C". If the neighbor is empty, we follow the empty neighbor's pointer (the index, above) to the empty neighbor's nearest non-empty neighbor to its left, continuing as necessary until we locate the first non-empty neighbor, which constitutes the value of C".

The foregoing technique, even though disclosed in the exemplary environment of credit card searching, will obviously be useful for any interval searching application using a subset of the digits of the values to be searched as a hashing index.

D. Alternative Embodiments and Aspects

The foregoing exemplary embodiment was set forth in a credit card context in which we searched on BeginIndexes (and, indirectly, EndIndexes) for data contained in ranges. Those skilled in the art will readily appreciate that the searching technique set forth above is usable in any other context requiring interval searching, and not just limited to the exemplary context of credit cards.

In the foregoing exemplary embodiment, each range (optionally) had an associated URL which was accessed when a card was found in the desired interval. In other embodiments, the URL could be replaced by some other type of information appropriate to the particular context. For example: (a) in a payroll environment, the BeginIndexes could include valid employee IDs (with or without ranges), and the URL (or equivalent) could include a description of the bonus payable to the employees; (b) in a business environment, the BeginIndexes could include valid customer IDs (with or without ranges), and the URL (or equivalent) could include a description of a discount, affinity program, or other special consideration applicable to the customers; (c) in a date-tracking environment, the BeginIndexes could include dates (with or without ranges), and the URL (or equivalent) could include a description of ticklers applicable to the dates; and (d) in an inventory environment, the BeginIndexes could include parts numbers (with or without ranges), and the URL (or equivalent) could include a description of qualified suppliers for those parts. Those skilled in the art will readily appreciate many other exemplary embodiments in which the SDH techniques described herein could be utilized.

In addition, access to the additional information could be triggered based on the intervals or otherwise. For example, there might be no intervals at all if we were doing a simple search (such as set forth in the examples of Sections A and B).

Finally, the same URL (or other additional information) may be repeated across a plurality of intervals. In this case we can save space by using an additional array to store the URLs. In the main data structure we store the index of the URL in this array instead of storing individual URL addresses. In such a case, we would only need 4 bytes for each URL in the main data structure, instead of 255 bytes in the prior examples—a savings of 251n bytes (offset, of course, by the size of the data structure required to store the URLs). In general, then, we could take advantage of repetitive information by storing such repetitive references (with or without the non-repetitive references) in a separate data structure, and replacing references to the repetitive references with a reference to the data structure.

The foregoing remarks illustrate that those skilled in the art will readily appreciate that virtually any environment involving integer searching can be accommodated using the techniques described herein. Therefore, the various embodiments and aspects described herein should be considered as merely illustrative. They are not intended to be exhaustive or to limit the general techniques illustrated herein to the particular exemplary embodiments and contexts in which they were disclosed. Rather, many other variations and modifications may be practiced without departing from the general spirit of the techniques set forth herein. It is intended that the scope of the invention(s) be defined by the claims that follow.

What is claimed is:

1. A method of constructing a computer-searchable hash table, comprising:
    (a) accessing a plurality of elements, including values representable in integer form in a base b;
    (b) selecting a hash index parameter, q, by taking into account computer memory and search time constraints;
    (c) constructing a hash table from said plurality of elements by:
        (i) initializing a plurality of at least L lists, where $L=b^q$;
        (ii) populating each of said lists with a subset of said plurality of elements (if any) that share at least q digits in common; and
    (d) storing said hash table including said populated lists in a computer memory, thereby allowing future searching thereof, for a target value, by using a q-digit portion of said target value as an index to said hash table.

2. The method of claim 1 further comprising:
    (e) receiving said target value, comprising said value in (d), and representable in integer form in said base b;
    (f) determining, in said hash table, a corresponding list configured to store elements sharing at least q digits in common with said target value;
    (g) determining if any of said elements of said corresponding list includes said target value;
    (h) if the result of (g) is positive, reporting a successful search result.

3. The method of claim 1 where said taking into account memory and search time constraints includes substantially minimizing said search time by using substantially all computer memory available to said search.

4. The method of claim 1 where said taking into account memory and search time constraints includes balancing said search time against utilization of said computer memory.

5. The method of claim 1 where said selecting said q in (b) includes:
    (i) for each of a plurality of possible values of q, computing the corresponding computer memory required to store the corresponding L lists; and
    (ii) selecting one of said potential values of q such that the corresponding required memory is available.

6. The method of claim 1 where said searching in (d) includes determining a location for an insert or delete operation.

7. The method of claim 1 further comprising maintaining a separate, searchable data structure for tracking insert/delete operations that have occurred since construction of said hash table.

8. The method of claim 1 where said plurality of elements include ranges of values to be checked for the presence of said target value.

9. The method of claim 8:
(1) configured for use in a credit card searching environment;
(2) where said elements include valid credit card ranges; and
(3) where said target value includes a credit card number.

10. The method of claim 9:
(1) implemented at a directory server accessible over a network by a party checking for validity of said credit card number;
(2) where said elements include at least one reference to an access control server containing information about participation in a payment authentication program.

11. The method of claim 1 further comprising representing one of said populated lists using another hash table in a manner analogous to the method of claim 1.

12. The method of claim 11 in which said q-digit portion of said target value represents the q most significant digits thereof, and said another hash table utilizes one or more of the next most significant digits (after q) of said target value values as a search index.

13. The method of claim 1 where:
(1) each of said elements includes data pertaining to a numeric interval; and
(2) facilitating the handling of an out-of-range interval by allowing a searcher to access a nearest non-empty list.

14. The method of claim 13 where (2) includes adding a reference, within each empty list, to a non-empty list nearest thereto.

15. The method of claim 1 further comprising padding shorter values within said plurality of elements to be the same length as longer values therein.

16. A method of conducting a computerized search of an integer database, comprising:
(a) accessing from a computer-readable memory a hash table:
 (i) including a plurality of at least L lists;
 (ii) at least one of said lists being non-empty;
 (iii) each said non-empty list including at least one value to be searched;
 (iv) each included value in said non-empty list sharing at least q common digits, where $L=b^q$ for some integer base b;
(b) receiving a target value, representable in integer form in a base b, to be searched among said plurality of lists; and
(c) determining, in said hash table, a corresponding list configured to store values having at least q digits in common with said target value;
(d) determining if any of said values of said corresponding list includes said target value;
(e) if the result of (d) is positive, reporting a successful search result.

17. The method of claim 16 where (d) includes searching said corresponding list using another hash table in a manner analogous to the search method of claim 16.

18. The method of claim 17 in which:
(i) said q represents the q most significant digits shared in common among said target value and said values in said list; and
(ii) said another hash table utilizes one or more of the next most significant digits (after q) of said target value as a search index.

19. The method of claim 16:
(1) where at least some of said included values are associated with data pertaining to a numeric interval;
(2) further comprising modifying each empty list to include a reference to the next-nearest non-empty list; and
(3) where said (d) includes handling an out-of-range interval by checking its nearest non-empty list.

20. A system for constructing a computer-searchable hash table, comprising:
(a) means for accessing a plurality of elements, including values representable in integer form in a base b;
(b) means for selecting a hash index parameter, q, by taking into account computer memory and search time constraints;
(c) means for constructing a hash table from said plurality of elements by:
 (i) initializing a plurality of at least L lists, where $L=b^q$;
 (ii) populating each of said lists with a subset of said plurality of elements (if any) that share at least q digits in common; and
(d) a computer memory for storing said hash table including said populated lists, thereby allowing future searching thereof, for a target value, by using a q-digit portion of said target value as an index to said hash table.

21. The system of claim 20 further comprising:
(e) means for receiving said target value, comprising said value in (d), and representable in integer form in said base b;
(f) means for determining, in said hash table, a corresponding list configured to store elements sharing at least q digits in common with said target value;
(g) means for determining if any of said elements of said corresponding list includes said target value;
(h) means for reporting a successful search result, if the result of (g) is positive.

22. The system of claim 20 where said taking into account memory and search time constraints includes substantially minimizing said search time by using substantially all computer memory available to said search.

23. The system of claim 20 where said taking into account memory and search time constraints includes balancing said search time against utilization of said computer memory.

24. The system of claim 20 where said selecting said q in (b) includes:
(i) computing the corresponding computer memory required to store the corresponding L lists, for each of a plurality of possible values of q; and
(ii) selecting one of said potential values of q such that the corresponding required memory is available.

25. The system of claim 20:
(1) configured for use in a credit card searching environment;
(2) where said elements include valid credit card ranges; and
(3) where said target value includes a credit card number.

26. The system of claim 25:
(1) implemented at a directory server accessible over a network by a party checking for validity of said credit card number; and
(2) where said elements include at least one reference to an access control server containing information about participation in a payment authentication program.

27. The system of claim 20:
(1) further comprising means for representing one of said populated lists using another hash table in a manner analogous to that of claim 20;
(2) where said q-digit portion of said target value represents the q most significant digits thereof; and
(3) where said another hash table utilizes one or more of the next most significant digits (after q) of said target value values as a search index.

28. A system for conducting a computerized search of an integer database, comprising:
(a) means for accessing from a computer-readable memory a hash table:
  (i) including a plurality of at least L lists;
  (ii) at least one of said lists being non-empty;
  (iii) each said non-empty list including at least one value to be searched;
  (iv) each included value in said non-empty list sharing at least q common digits, where $L=b^q$ for some integer base b;
(b) means for receiving a target value, representable in integer form in a base b, to be searched among said plurality of lists;
(c) means for determining, in said hash table, a corresponding list configured to store values having at least q digits in common with said target value;
(d) means for determining if any of said values of said corresponding list includes said target value; and
(e) means for reporting a successful search result, if the result of (d) is positive.

29. The system of claim 28 where (d) includes means for searching said corresponding list using another hash table in a manner analogous to that of claim 28.

30. The system of claim 29 in which:
(i) said q represents the q most significant digits shared in common among said target value and said values in said list; and
(ii) said another hash table utilizes one or more of the next most significant digits (after q) of said target value as a search index.

31. The system of claim 28:
(1) where at least some of said included values are associated with data pertaining to a numeric interval;
(2) further comprising means for modifying each empty list to include a reference to the next-nearest non-empty list; and
(3) where said (d) includes means for handling an out-of-range interval by checking its nearest non-empty list.

32. A computer-readable medium containing logic instructions for constructing a computer-searchable hash table, said instructions if executed:
(a) accessing a plurality of elements, including values representable in integer form in a base b;
(b) selecting a hash index parameter, q, by taking into account computer memory and search time constraints;
(c) constructing a hash table from said plurality of elements by:
  (i) initializing a plurality of at least L lists, where $L=b^q$;
  (ii) populating each of said lists with a subset of said plurality of elements (if any) that share at least q digits in common; and
(d) storing said hash table including said populated lists in a computer memory, thereby allowing future searching thereof, for a target value, by using a q-digit portion of said target value as an index to said hash table.

33. The computer-readable medium of claim 32 further comprising logic instructions that if executed:
(e) receive said target value, comprising said value in (d), and representable in integer form in said base b;
(f) determine, in said hash table, a corresponding list configured to store elements sharing at least q digits in common with said target value;
(g) determine if any of said elements of said corresponding list includes said target value; and
(h) if the result of (g) is positive, report a successful search result.

34. The computer-readable medium of claim 32 where said taking into account memory and search time constraints includes substantially minimizing said search time by using substantially all computer memory available to said search.

35. The computer-readable medium of claim 32 where said taking into account memory and search time constraints includes balancing said search time against utilization of said computer memory.

36. The computer-readable medium of claim 32 where said selecting said q in (b) includes:
(i) for each of a plurality of possible values of q, computing the corresponding computer memory required to store the corresponding L lists; and
(ii) selecting one of said potential values of q such that the corresponding required memory is available.

37. The computer-readable medium of claim 32:
(1) configured for use in a credit card searching environment;
(2) where said elements include valid credit card ranges; and
(3) where said target value includes a credit card number.

38. The computer-readable medium of claim 37:
(1) implemented at a directory server accessible over a network by a party checking for validity of said credit card number; and
(2) where said elements include at least one reference to an access control server containing information about participation in a payment authentication program.

39. The computer-readable medium of claim 32:
(1) further comprising logic instructions that if executed represent one of said populated lists using another hash table in a manner analogous to that of claim 32;
(2) where said q-digit portion of said target value represents the q most significant digits thereof; and
(3) where said another hash table utilizes one or more of the next most significant digits (after q) of said target value values as a search index.

40. A computer-readable medium containing logic instructions for conducting a computerized search of an integer database, said instructions if executed:
(a) accessing from a computer-readable memory a hash table:
  (i) including a plurality of at least L lists;
  (ii) at least one of said lists being non-empty;
  (iii) each said non-empty list including at least one value to be searched;
  (iv) each included value in said non-empty list sharing at least q common digits, where $L=b^q$ for some integer base b;
(b) receiving a target value, representable in integer form in a base b, to be searched among said plurality of lists;
(c) determining, in said hash table, a corresponding list configured to store values having at least q digits in common with said target value;

(d) determining if any of said values of said corresponding list includes said target value;

(e) if the result of (d) is positive, reporting a successful search result.

41. The computer-readable medium of claim 40 where (d) includes searching said corresponding list using another hash table in a manner analogous to the search computer-readable medium of claim 40.

42. The computer-readable medium of claim 41 in which:

(i) said q represents the q most significant digits shared in common among said target value and said values in said list; and (ii) said another hash table utilizes one or more of the next most significant digits (after q) of said target value as a search index.

43. The computer-readable medium of claim 40:

(1) where at least some of said included values are associated with data pertaining to a numeric interval;

(2) further comprising logic instruction that if executed modify each empty list to include a reference to the next-nearest non-empty list; and (3) where said (d) includes handling an out-of-range interval by checking its nearest non-empty list.

* * * * *